Dec. 8, 1931.  M. WETSTEIN  1,835,251
SEPARABLE PLUG
Filed Sept. 23, 1926
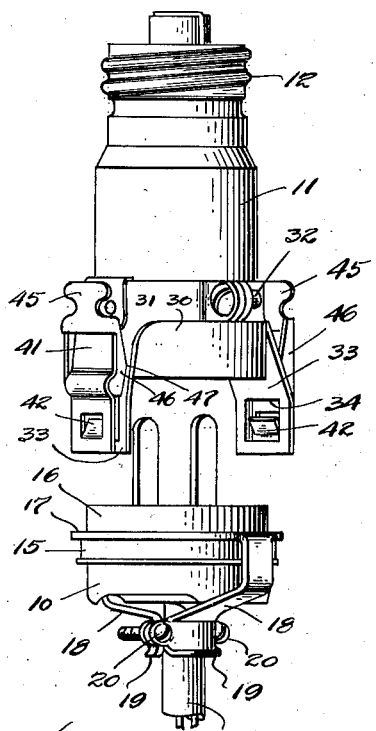
INVENTOR.
Mentor Wetstein
BY
Francis D. Hardesty
ATTORNEY.

Patented Dec. 8, 1931

1,835,251

UNITED STATES PATENT OFFICE

MENTOR WETSTEIN, OF CINCINNATI, OHIO

SEPARABLE PLUG

Application filed September 23, 1926. Serial No. 137,251.

The present invention relates to separable plugs for electric conductors.

One of the common uses of plugs of this kind is to permit quick attachment of extension light cords by means of which a workman, for example, may carry over a limited area a portable lamp and provide himself with light in places not reached by the stationary lights in the usual installation. Another use for such plugs is for quick attachment of the cords of portable or hand machines such as hand electric drills, carpet sweepers and the like.

In such uses the operator quite frequently unintentionally jerks the cord and, in so doing, often separates the plug and cuts off the power when it is very necessary.

Among the objects of the invention is to obviate this difficulty and provide a plug which, although readily separable when desired, nevertheless will not separate under jerking or other rough handling.

Other objects will readily appear to those skilled in the art upon reference to the following description and drawings in which:

Fig. 1 is a side view of the plug showing the parts separated;

Fig. 2 is an elevation of the assembled plug with parts in section;

Fig. 3 is a section on line 3—3 of Fig. 2;

Fig. 4 is a view similar to Fig. 2 showing a modified form of the plug.

As indicated, the male and female portions 10, 11 respectively of the plug may be of conventional interior structure and the female portion is preferably provided with a threaded portion 12 adapted to screw into an ordinary light socket (not shown).

In the form shown in Figs. 1 and 2 the male portion is provided with a shoulder 15 and over this shoulder is a metal ring 16 having an outwardly extending flange 17. This ring 16 has two downwardly extending arms 18 which terminate in the curved and flanged ends 19. These flanged ends are provided with holes through which pass the screws 20 by means of which the ends 19 may be made to grip tightly the cord 21 and prevent the latter from being pulled out of the member 10.

The socket member 11 also is provided with a shoulder 30 behind which lies a ring 31 secured in place by screw 32. Ring 31 is also provided with downwardly extending arms 33 diametrically located and sufficiently long to extend beyond flange 17 when the parts are together. These arms 33 are slotted as at 34.

Also secured to ring 31 as by rivets 40 are two spring members 41 which over lie arms 33 and are of about the same length but somewhat narrower. Near their ends members 41 are provided with the punched in teeth 42 sufficiently long and at such an angle as to extend through the slots 34 and project beyond the inner surfaces of arms 33.

These spring members 41 are free at their outer ends and are adapted to be lifted away from the arms 33 by means of levers 45. These are preferably formed from sheet metal by punching a rectangular hole near one end of slightly greater width than the members 41 and turning down the sides 46. These sides 46 are preferably formed with an angular contour so that the angle 47 thereof forms a fulcrum upon which the lever 45 may lift the members 41 when the outer end is pressed.

In the operation of the device, the male member 10 of the plug is inserted and the teeth 42 of the members 41 slide over and drop behind the flange or shoulder 17 on the ring 16 holding the two parts firmly together. In separating, of course, it is necessary to press levers 45 and lift the teeth 42 free of the part 17, whereupon the two parts of the plug may be pulled apart.

In the modification of Fig. 4, the ring 16 is not used and the locking flange or shoulder 17a is formed upon the member 10a and of the material thereof. Otherwise the devices are or may be identical.

Having now described the invention and the preferred forms of embodiment thereof, it is to be understood that the said invention is not to be limited to the specific details herein set forth but only by the scope of the claim which follows.

I claim:—

Means for locking together separable electric plug parts, comprising a ring member adapted to be secured to one of said parts, and having an outwardly projecting flange, a second ring member adapted to be secured to the other of said parts and having arms extending toward and over the flanged member, said arms being rigid and having slots near their free ends, spring members secured to said second ring member overlying said arms and having latch portions extending through said slots and adapted to cooperate with said flange, and latch lifting means carried by said arms and operatively connected to said spring members.

MENTOR WETSTEIN.